United States Patent [19]

Lisfeld

[11] Patent Number: 4,575,199
[45] Date of Patent: Mar. 11, 1986

[54] FOCUSING DRIVE FOR A MICROSCOPE WITH FLEXIBLE DRIVE SHAFT

[75] Inventor: Robert Lisfeld, Greifenstein-Ulm, Fed. Rep. of Germany

[73] Assignee: Ernst Leitz Wetzlar GmbH, Wetzlar, Fed. Rep. of Germany

[21] Appl. No.: 487,990

[22] Filed: Apr. 25, 1983

[30] Foreign Application Priority Data

Apr. 26, 1982 [DE] Fed. Rep. of Germany ....... 3215566

[51] Int. Cl.[4] ................. F16H 35/18; G01J 1/20; G02B 21/26
[52] U.S. Cl. ................................ 350/530; 74/10.8; 250/201
[58] Field of Search ............... 350/530, 521, 522; 74/479, 10.8; 250/201

[56] References Cited

U.S. PATENT DOCUMENTS

| | | | |
|---|---|---|---|
| 2,669,158 | 8/1950 | Frischmann | 350/530 |
| 3,887,267 | 6/1975 | Heller | 350/522 |
| 4,090,069 | 4/1978 | Lisfeld | 250/201 |
| 4,367,915 | 1/1983 | Georges | 350/530 |

FOREIGN PATENT DOCUMENTS 1316033 4/1963 France .
16-9420 5/1941 Japan .

OTHER PUBLICATIONS

"The Planetary Gear of the ORTHOPLAN", Ernst Leitz Wetzlar GmbH, printed in W. Germany.

Primary Examiner—John K. Corbin
Assistant Examiner—David Lewis
Attorney, Agent, or Firm—Schwartz, Jeffery, Schwaab, Mack, Blumenthal & Evans

[57] ABSTRACT

The drive has a manual coarse/fine focusing device using a gear drive and additional fine focusing using a motor. The latter is effected through an eccentric cam, rotatingly supported in a guide plate and coupled with the motor. A ball bearing rigidly joined with the object holder and the microscope stage rests on the eccentric cam. During operation of the motor, only the ball bearing and, thus, the microscope stage are raised or lowered; the gear drive for manual focusing remains stationary.

12 Claims, 2 Drawing Figures

FOCUSING DRIVE FOR A MICROSCOPE WITH FLEXIBLE DRIVE SHAFT

BACKGROUND OF THE INVENTION

1. Field of the Invention

The present invention relates to a drive mechanism for the focusing of a microscope and more particularly to such a drive mechanism in which manual adjustments are made with a gear drive, and an additional fine adjustment is made by a motor through a control element.

2. Discussion of Related Art

A motor drive for the sharp focusing of microscopes with coarse and fine adjustments is disclosed in DE-P No. 22 62 612. The coarse and fine adjustments are effected by use of a common spindle, with the drive for the fine focusing being engageable and disengageable with the spindle. Two bidirectional motors are provided, one of which performs the coarse adjustment and the other of which performs the fine adjustment. A control element effects the engagement of the drive means with the fine adjustment motor by means of a cam and also controls the starting and stopping of the motors. The coarse adjustment motor has a shaft parallel to the spindle. A gear is mounted on this shaft and constantly meshes with a gear mounted on the spindle. The fine adjustment motor is supported on a carrier with its shaft perpendicular to the spindle. The carrier is pivotable against the tension of a spring. The fine adjustment motor shaft carries a worm, which meshes with a worm wheel seated on the spindle.

A coarse and fine focusing device is disclosed in JA No. 41-9420 which may be operated both manually and with a motor. The arrangement requires no coupling, but needs an additional gear drive for the motor. Furthermore, a vertical adjustment of the control knobs for manual focusing takes place simultaneously with the actuation of the drive.

In FR No. 1 316 033, a focusing mechanism for a microscope is disclosed which may be actuated manually and by means of a motor. Two separate drive shafts, acting on separate guides, for the manual coarse and fine adjustment are connected through two friction clutches and flexible shafts with two motors, which effect the coarse and fine motor focusing. Here again the adjusting knob for fine focusing travels upward or downward upon the actuation of the coarse adjustment.

Finally, DE-OS 26 27 486 discloses a coarse and fine adjusting gear drive for microscopes which may be actuated manually by means of a planetary gear drive or by a drive motor for automatic focusing. The automatic focusing is independent of the manual fine focusing by way of the planetary gear, but is effected through the same gear connection as the coarse drive motion and requires a further helical gear and an additional angular lever. The manual coarse and fine adjustments in this known apparatus require separate, parallel drive shafts.

SUMMARY OF THE PRESENT INVENTION

One object of the present invention is to provide a focusing drive for a microscope in which both coarse and fine focusing adjustments can be made easily.

Another object of the present invention is to provide a focusing drive for a microscope wherein manual and powered focusing adjustments are made independently of each other so that powered focusing will not disturb the position of manual adjustment controls.

A further object of the present invention is to provide a focusing drive for a microscope which includes a fine focusing adjustment which is simple in construction to eliminate sources of error and irregularities present in complicated structures.

In accordance with the above and other objects, the present invention is a microscope having an adjustable portion and a focusing drive for moving the adjustable portion. The focusing drive includes manual adjustment means comprising a gear drive connected to the adjustable portion for moving the portion in response to manual actuation, and motor means for moving the portion independently of the gear drive. The motor drive means comprises a motor and a control element connecting the motor to the adjustable portion.

The focusing drive can include a guide plate mounted for sliding movement, with the control element being mounted rotatingly in the guide plate, and means attached to the portion for contacting said control element.

In accordance with other aspects of the invention, the microscope comprises a portion mounted for vertical movement to effect a focusing adjustment and a slide element mounted for vertical movement. A manual actuation means comprising a gear drive is connected to the slide element for moving the slide element vertically in response to manual actuation. A motor drive means for producing powered movement of the portion, comprising a motor and a control element mounted to the slide element and connected to the motor for movement by said motor, is also provided. The control element contacts the portion to cause vertical displacement of the portion in response to powered movement of the control element produced by said motor.

In a preferred embodiment, the control element is a cam connected for rotation by the motor. Also, the gear drive includes a rack connected to the slide element and a pinion gear meshing with the rack. Further, the microscope can include a flexible shaft connecting the motor to the control element.

BRIEF DESCRIPTION OF THE DRAWINGS

The present invention will become more readily apparent from the detailed description to follow wherein like elements represent like parts throughout and in which.

DETAILED DESCRIPTION OF THE PREFERRED EMBODIMENT

Figure 1:
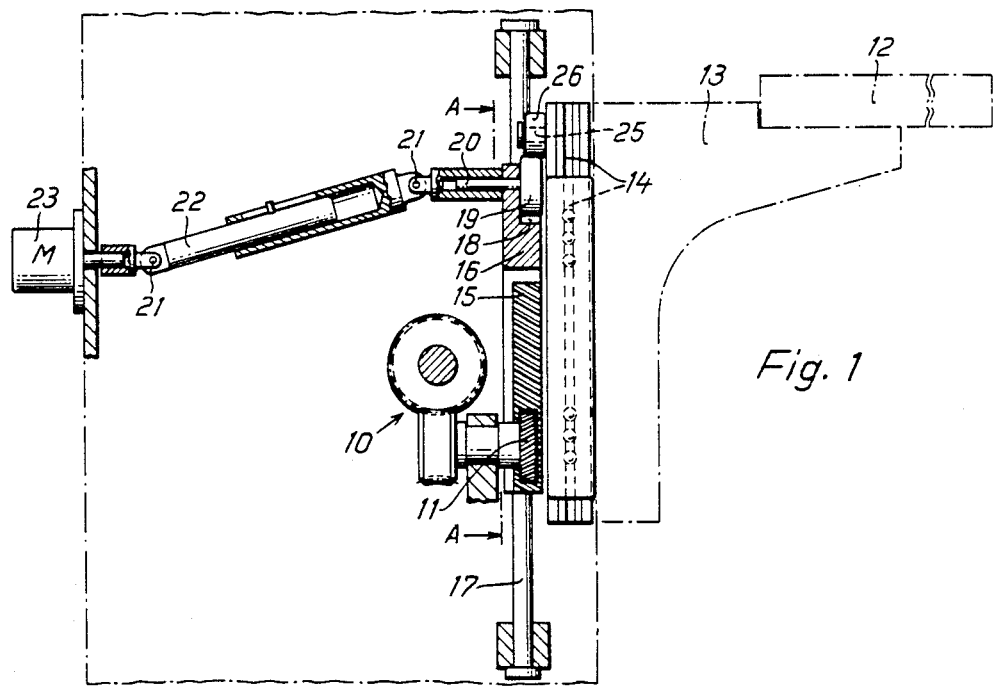
FIG. 1 shows a fragmental longitudinal sectional view of a microscope with a drive according to the present invention.

The microscope depicted fragmentally in FIG. 1 has a manually actuated coarse/fine gear drive designated generally by reference numeral 10. Gear drive 10 includes coaxial actuating knobs and generally corresponds to the known planetary gear described in the Leitz pamphlet "The Planetary Gear of the Orthoplan, a Precision Drive in Microscope Construction", Insert to List 512-82b. For this reason a detailed description is omitted here. (Orthoplan is a registered trademark.)

The manually actuable gear drive 10 is stationarily mounted on the microscope housing and transmits any manual adjusting movement to an end gear 11 which meshes with a toothed rack 15, mounted on a guide plate 16. Guide plate 16 is supported slidingly in a vertical position by rods 17. At its upper end the guide plate 16 is provided with a recess 18. A control element 19 in the form of an eccentric cam is rotatingly mounted in recess 18 by a shaft 20, which is journalled in plate 16. One end of shaft 20 is fixed to cam 19 and the other end of shaft 20 is connected by means of a flexible drive shaft 22 to the drive shaft of a directionally reversible motor 23. Drive shaft 22 includes a longitudinally extensible shaft connected at its end to a pair of universal joints 21. A guide element in the form of a journal 25 carrying a ball bearing 26 rests on the eccentric cam 19. Journal 25 is fixedly attached to the object holder 13 of a microscope stage 12.

During manual focusing, the end gear 11 of the gear drive 10 causes the toothed rack 15 and the guide plate 16 to be adjusted vertically. The vertical movement of the guide plate 16 is transmitted through the control element 19 and the guide element 25, 26 to the object holder 13, thus causing the microscope stage to slide in guide rail 14. As can be understood from the above explanation, manual adjustment produces a simultaneous movement of the guide plate 16, the control element 19 and the guide element 25, 26.

Fine focusing is effected by means of motor 23 which rotates control element 19 through drive shaft 22. Control element 19, it will be recalled, is rotatingly supported in the guide plate 16 only. Due to its eccentricity, rotation of control element 19 raises or lowers guide element 25, 26 connected to the object holder 13, thereby resulting in vertical adjustment of the microscope stage 12. The maximum adjustment range is determined by the throw of the eccentric cam chosen. Fine focusing with motor 23 does not affect the position of the gear drive 10 or the vertical position of the guide plate 16.

Figure 2:
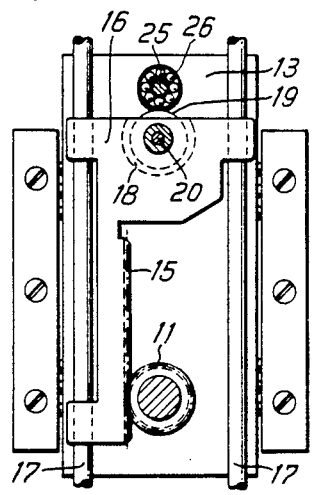
FIG. 2 shows a sectional view taken along the line A—A of FIG. 1.

Even though the embodiment in FIGS. 1 and 2 shows an object holder which is moved in the vertical direction, it will be apparent that the drive according to the present invention may be used in the same manner to adjust a different stage of the microscope. Also, a cam of different configuration may be used as the control element, for example, a cardioid curve may be used. As another alternative, the cam could be positioned in a recess in the guide rail 14, so that the guide rail rests directly on the cam. A rigid drive shaft may also be used between the motor and the control element, if the available space permits the motor 23 to be moved vertically together with the guide plate and the control element.

A microscope equipped with the drive according to the present invention is suitable for the continuous observation of nonplanar objects, i.e. objects having vertical irregularities, by virtue of the fact that fine focusing by the motor produces a scanning motion of the focus along the Z axis.

The foregoing description is presented for the purpose of clearly illustrating the present invention. Numerous additional changes can be made without departing from the scope of the invention as set forth in the appended claims.

What is claimed is:

1. In a microscope having an adjustable portion, a focusing drive for moving said adjustable portion, comprising:
   manual coarse and fine adjustment means comprising a gear drive connected to said portion for moving said portion in response to manual actuation to effect individual coarse and fine adjustments, said manual adjustment including separate actuating knobs connected to said gear drive to effect, respectively, said coarse and fine adjustments; and
   motor drive means for moving said portion independently of said gear drive, such that said gear drive remains stationary during actuation of said motor drive means, said motor drive means comprising a motor and a control element connected to effect movement of the adjustable portion in response to said motor.

2. A focusing drive as set forth in claim 1 comprising a guide plate mounted for sliding movement, said control element being mounted rotatingly in said guide plate, and means attached to said portion for contacting said control element.

3. A focusing drive as set forth in claim 2 wherein said gear drive comprises a toothed rack mounted on said guide plate.

4. A focusing drive as set forth in claim 1 wherein said separate actuating knobs connected to said gear drive are arranged coaxially.

5. A focusing drive as set forth in claim 1 wherein said motor drive means comprises a flexible drive shaft connecting said motor to said control element.

6. A microscope as set forth in claim 5 wherein said control element comprises an eccentric cam connected to be rotated by said flexible shaft, and a guide element connected to said adjustable portion and positioned to move in response to rotation of said eccentric cam.

7. A focusing drive as set forth in claim 1 wherein said adjustable portion is mounted for vertical movement.

8. A microscope as set forth in claim 1 wherein said control element comprises an eccentric cam.

9. A microscope, comprising:
   a portion mounted for vertical movement to effect a focusing adjustment;
   a slide element mounted for vertical movement;
   manual coarse and fine actuation means comprising a gear drive connected to said slide element for moving said slide element vertically in response to manual actuation to effect individual coarse and fine adjustments, said manual adjustment including separate actuating knobs connected to said gear drive to effect, respectively, said coarse and fine adjustments; and
   motor drive means for producing powered movement of said portion independently of said gear drive such that said gear drive remains stationary during actuation of said motor drive means, comprising a motor, and a control element mounted to said slide element and connected to be moved by said motor, said control element contacting said portion to cause vertical displacement of said portion in response to powered movement of said control element produced by said motor.

10. The microscope as set forth in claim 9 wherein said control element is a cam connected for rotation by said motor.

11. The microscope as set forth in claim 9 wherein said gear drive includes a rack connected to said slide element and a pinion gear meshing with said rack.

12. The microscope as set forth in claim 9 including a flexible shaft connecting said motor to said control element.

* * * * *